(12) United States Patent
Aller

(10) Patent No.: US 7,311,347 B1
(45) Date of Patent: Dec. 25, 2007

(54) GOLF CART WINDSHIELD ATTACHMENT

(75) Inventor: David Bruce Aller, Tomah, WI (US)

(73) Assignee: Debbie Dorzok, Tomah, WI (US)

( * ) Notice: Subject to any disclaimer, the term of this patent is extended or adjusted under 35 U.S.C. 154(b) by 6 days.

(21) Appl. No.: 11/492,389

(22) Filed: Jul. 25, 2006

Related U.S. Application Data

(60) Provisional application No. 60/711,901, filed on Aug. 25, 2005.

(51) Int. Cl.
 *B60J 1/00* (2006.01)
(52) U.S. Cl. .................. 296/77.1; 296/84.1; 296/96.21
(58) Field of Classification Search ............... 296/77.1, 296/84.1, 79, 96.21, 100.14, 102; 280/DIG. 5; 114/361
 See application file for complete search history.

(56) References Cited

U.S. PATENT DOCUMENTS

| | | | |
|---|---|---|---|
| 3,958,826 A | 5/1976 | Upton | |
| 4,014,589 A | 3/1977 | Yerkey | |
| 4,232,080 A * | 11/1980 | Orain et al. | 296/84.1 |
| 4,343,503 A | 8/1982 | Samuelson et al. | |
| 4,488,750 A | 12/1984 | Gerber | |
| 4,584,229 A * | 4/1986 | Bourelier et al. | 296/84.1 |
| 4,773,695 A | 9/1988 | Jones et al. | |
| 4,792,175 A | 12/1988 | Gerber | |
| 4,795,205 A | 1/1989 | Gerber | |
| 4,819,979 A | 4/1989 | Moglia | |
| 5,110,174 A | 5/1992 | Andree | |
| 5,192,109 A | 3/1993 | Roberts | |
| 5,195,797 A * | 3/1993 | Hobbs | 296/77.1 |
| 5,211,214 A * | 5/1993 | Shaw | 160/369 |
| 5,385,379 A * | 1/1995 | Heavner | 296/84.1 |
| 5,385,380 A * | 1/1995 | Heavner | 296/84.1 |
| 5,393,118 A | 2/1995 | Welborn | |
| 5,568,953 A * | 10/1996 | Showalter | 292/194 |
| 5,791,720 A * | 8/1998 | Moore et al. | 296/96.21 |
| 5,954,385 A * | 9/1999 | Moore et al. | 296/96.21 |
| 5,975,615 A * | 11/1999 | Showalter | 296/77.1 |
| 6,302,440 B1 * | 10/2001 | Goodstein | 296/96.11 |
| 6,663,158 B1 * | 12/2003 | Showalter | 296/84.1 |
| 7,007,999 B1 * | 3/2006 | Schneller | 296/77.1 |
| 7,165,802 B1 * | 1/2007 | Flynn | 296/84.1 |
| 7,267,388 B2 * | 9/2007 | Hanson et al. | 296/77.1 |
| 2005/0161971 A1 * | 7/2005 | Wilson | 296/79 |
| 2006/0232093 A1 * | 10/2006 | Boehm et al. | 296/96.21 |
| 2006/0249976 A1 * | 11/2006 | Hanson et al. | 296/77.1 |
| 2007/0187919 A1 * | 8/2007 | Furman | 280/124.175 |

* cited by examiner

*Primary Examiner*—Kiran B. Patel
(74) *Attorney, Agent, or Firm*—M. Paul Hendrickson

(57) ABSTRACT

The present invention provides a light weight windshield attachment adapted for easy attachment and detachment from a vehicular supportive frame. The attachment includes a circumscribing frame and a tautly stretched film possessing a high order of elastic memory so as to elastically stretch and absorb an impacting projectile while returning to an innate stretched film structure after the impacting force. A bi-folding attachment attached to a golf cart canopy provides a golf cart windshield superior in function and performance over current golf cart windshields.

8 Claims, 4 Drawing Sheets

GOLF CART WINDSHIELD ATTACHMENT

This application is a non-provisional application of earlier filed provisional application No. 60/711,901, entitled "Golf Cart Window Insert Attachment", filed on behalf of David Bruce Aller on Aug. 25, 2005.

FIELD OF INVENTION

The present invention relates to a window attachment and more particularly to a hinged window insert attachment for a golf cart and its use.

BACKGROUND OF THE INVENTION

Golf carts are often equipped with an open canopy to protect the occupants from sun and rain. The plastic topped canopy is typically supported by a pair of forwardly positioned vertical support posts in the form of square aluminum tubes of a u-shaped construction which mount onto the front chassis of a golf cart and a pair of similar rearwardly positioned support posts. In order to further protect the occupants, the canopy may be fitted with side curtains with viewing sewn onto the side curtains to provide side viewing.

Although conventional transparent plastic films have been heretofore used as the side curtain windows, heavy plexiglass panels hinged together so as to provide a bi-folding upper panel section and lower panel section have been almost exclusively used as a windshield attachment for a golf carts. The conventional plastics used as side curtain windows are ill suited to meet the safety requirements of a windshield. The two rigid plexiglass window panels are typically retained in a closed windshield position by upper windshield retaining brackets which are designed to bracket onto a horizontal canopy brace and roof support bridging between the two forwardly positioned canopy vertical support posts. The upper retaining brackets are each equipped with windshield panel receiving channels so as to retain the windshield in a closed position. The lower windshield panel is also equipped with similarly designed lower windshield panel retaining brackets which anchor the lower windshield panel bracket to the canopy frame. Retaining brackets channeling onto the upper panel sections serve to retain the upper panel section against the lower panel section when the hinged upper panel section is placed in the open position.

The current golf cart plexiglass windshield attachments are costly, heavy and prone to damage under extended use or when struck by fast moving projectiles such as swinging golf clubs and errant golf balls. The rigid plexiglass windshield panes are also prone to breakage and cracking along the canopy post anchoring sites which leads to costly replacement repair. There exists a need for golf cart windshield attachment capable of withstanding high velocity projectiles damage caused by normal wear of common usage and the impacting of such as a errant swinging golf club or golf ball. There is a further need for a transparent window unit which may also be easily and cheaply replaced. It would also be advantageous to equip a canopied golf cart with a light weight, stowable golf cart windshield attachment which may readily be attached and detached from the golf cart canopy. Light weight fasteners which engage upon interfacial contact and separate upon pulling would provide an improvement over the rigid and bulky current retaining brackets. Notwithstanding the need for a more cost effective and repairable folding golf cart windshield, little advancement has been made in the providing of a more useful golf cart windshield attachment.

SUMMARY OF THE INVENTION

The present invention provides a golf cart windshield attachment which may be readily installed and removed from the golf cart. The attachment includes a window frame tautly framing an impact absorbing and high strength polyvinyl chloride (occasionally referred to as PVC herein) film possessing a substantially high order of elastic memory so as to biaxial and elastically stretch upon impacting with a blunt projectile and then return after impact to a film tautly framed within the windshield frame. The windshield attachment also includes securing members for securing the attachment to the canopy frame of a golf cart and most appropriately a hinged member dividing the windshield attachment into a foldable top or upper windshield section and a lower windshield section.

The hinged windshield attachment allows the upper windshield section to be placed in a closed position to more fully protect the occupants against inclimate conditions and errant golf balls and clubs or an open position to allow the air and wind currents to more freely flow through the open windshield. In order to provide an impacting absorbing film to effectively serve as a windshield, the film is tautly circumscribed within the windshield frame which in turn allows for localized stretching about an impacting site to conform onto the impacting site of a impacting projectile and thereafter return to its original taut confirmation after absorbing the impacting force. The inherent memory attributes imparted to the PVC film by its unique biaxially orientating character and manufacture creates a film having this unique and generally atypical physical plastic film attribute. In contradiction to the more common conventional plastic films (such as commonly used in golf cart side curtains) which are incapable of elastically stretching upon impact and susceptible to breakage upon impact, the windshield films of this invention elastically stretch without being susceptible to breakage.

Unlike conventional golf cart windshields which simply deflect impacted projectiles, the windshield attachment of this invention is equipped with a transparent film which will, upon a golf ball striking the transparent PVC film, elastically stretch so as to create a contour mating to the hemisphere of a golf ball embedded therewithin and then elastically contract or return (via its inherent memory properties) to a tautly stretched film structure within the supportive window frame structure. The greater the impacting force exerted upon the film, the more the PVC film will stretch to accommodate the force. This feature is accomplished by using a tautly framed transparent polyvinyl chloride (PVC) film possessing a high degree of transparency with an unique inherent ability to elastically deform and absorb the shock of fast moving, blunt projectiles (e.g. even those capable of traveling at speeds of about 100 miles per hour or more) by elastically expanding to partially surround the impacting projectile and then after absorbing the impact to elastically return to its original taut film character. Chances of shattering a windshield or potentially injuring a golf cart occupant with an errant ball is effectively alleviated by the embodiments of this invention. Unlike the plexiglass windshields which are prone to cracking upon continued vibrational use, the PVC films herein are inherently resistant to shattering and cracking. Atypical of conventional plexiglass golf cart windshields, the over-all weight of the attachment is also substantially reduced. This alleviates adding excessive golf cart weight and the need for the heavier golf canopy anchoring systems by allowing the light weight, easily engageable and separable mating hook and loop fasteners to effectively secure the windshield attachment to the golf canopy posts.

If it becomes necessary to replace or repair the transparent windshield pane, a PVC film replacement may be easily installed. The transparent windshield film is also superior to other conventional rigid windshield panes in that it is not prone to scratching or clouding such as arises by excessive heat or by sunlight. In addition, the transparent film alleviates the plexiglass tendency to harden or become brittle upon aging.

DETAILED DESCRIPTION OF THE INVENTION

Figure 1:
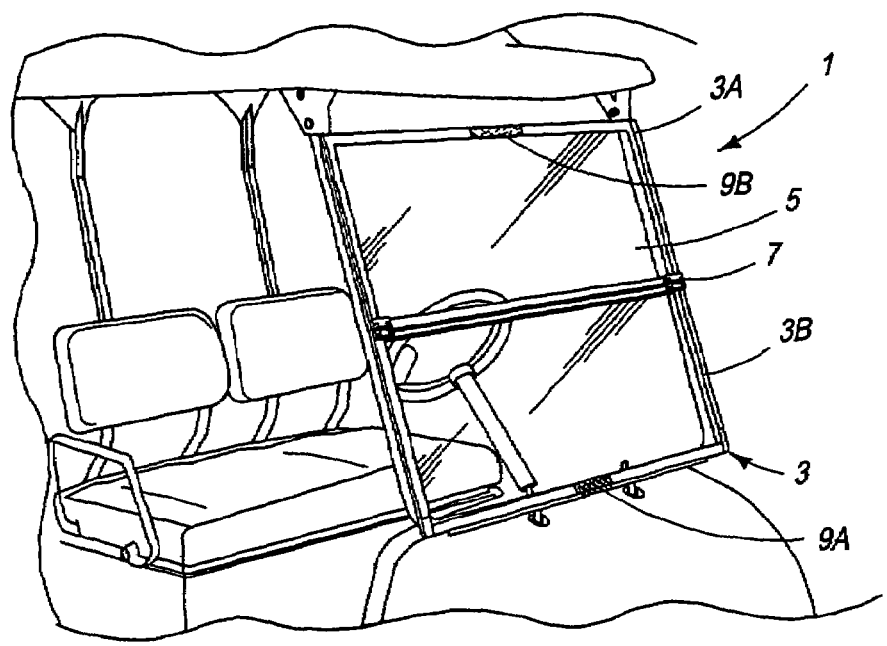
FIG. 1 depicts an elevational, partial frontal view of a golf cart equipped with the golf cart windshield attachment of this invention with the windshield sections placed in a closed windshield position.

Pursuant to the present invention, there is provided a hinged windshield attachment 1 adapted for installation onto a supportive canopy frame F of a golf cart canopy C or other suitable vehicular windshield mount, said attachment 1 comprising an impact absorbing polyvinyl chloride film 5 possessing a high order of elastic memory so as to return to a tautly stretched film structure after receiving a blunt and forceful impacting blow thereupon. The PVC window film 5 is firmly anchored onto a circumscribing window frame (generally prefixed by a 3) so as to tautly frame the window film 5 therein. The frame 3 is most suitably provided as a pair of bi-folding windshield frames 3A (upper) & 3B (lower) having the framed film 5 anchored thereto and equipped with a horizontally disposed hinge 7 so as to permit horizontal hinging of the frame 3 to an open position of FIG. 1 or a closed position of FIG. 2. The attachment 1 appropriately equipped with the bi-folding window frames 3A & 3B may be suitably equipped with securing members 9 for securing the windshield frame 3 and attachment 1 to the golf canopy frame F.

The windshield frame 3 serves to circumscribe and tautly secure the impact resistant and impacting yielding film 5 to the windshield frame 3. The circumscribing windshield frame 3 biaxially anchors or secures a peripheral margin of the PVC film 5 so that when a projectile strikes the PVC film 5, an impacting area or site in juxtaposition to the striking zone will elastically expand to conform to the configuration of the flight path of the impacting projectile. The biaxial elasticity of the film 5 absorbs the projectile impacting energy while deforming sufficiently to stop the projectile movement. The windshield frame 3 circumscribes and tautly anchors the impact absorbing PVC windshield film 5 to windshield frame 3 as a surrounding single frame or more appropriately as a bi-folding frame such as generally depicted by FIGS. 1-3 and 8. Since the windshield film 5 will biaxial stretch upon impact to accommodate the impacting force, the circumscribing frame 3 allows the anchored window film 5 to elastic stretch biaxial (while being held by frame 3) about the impacting site whereupon the inherent memory characteristics of the windshield film 5 coupled with the tautly stretching of the film 5 within the windshield frame 3 allows the tautly stretched film 5 to return to its substantially unstretched or indigenous film condition.

Although the windshield frame 3 may be manufactured in a variety of different ways (e.g. channeling or grooving frame or rectangular precursors, calendaring, molding, etc.), the windshield frame 3 may be most appropriately manufactured by extruding a molten light material (e.g. specific density ranging from about 1 to about 5 and preferably from about 2 to 3) through a die forming orifice to structurally create a supportive windshield frame 3 equipped with an anchoring channel 6 for biaxially anchoring the film 5 thereto. The extrusion process produces a windshield frame 3 characterized as having sufficient supportive strength to retain its structural integrity when the windshield film 5 is stretched and biased into the anchoring change 6 with a wedging and anchoring member 6V such as v-spline.

The frame 3 may be constructed of a variety of natural and synthetic frame materials. Light natural and synthetic materials which extruded in a molten state and die formed into the desired windshield frame configuration are preferred. Such extrudable materials include the light weight metals such as aluminum and thermoplastics such as the homopolymer and copolymers of PVC, the polyolefins (e.g. polyethylene and polypropylene, etc.), the polymers of styrene, acrylic acid and ester derivatives, butadiene such as those commonly used in the automotive and appliance industries as well as the thermoset resins such as the epoxides and synthetic composites as commonly used in the marine, automotive aircraft and construction businesses.

Figure 5:
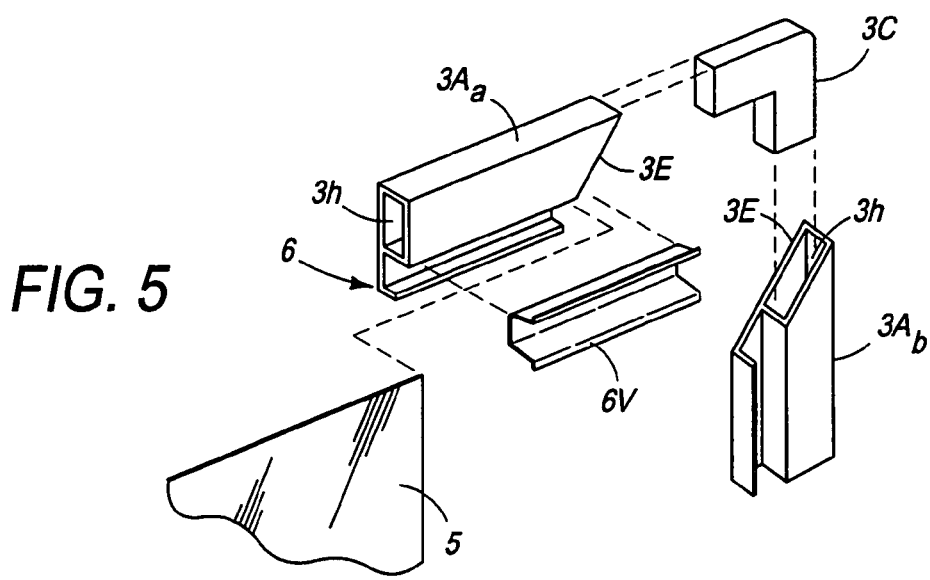
FIG. 5 shows an exploded elevational frontal view of a frame corner section of the windshield attachment shown in FIG. 1.
Figure 6:
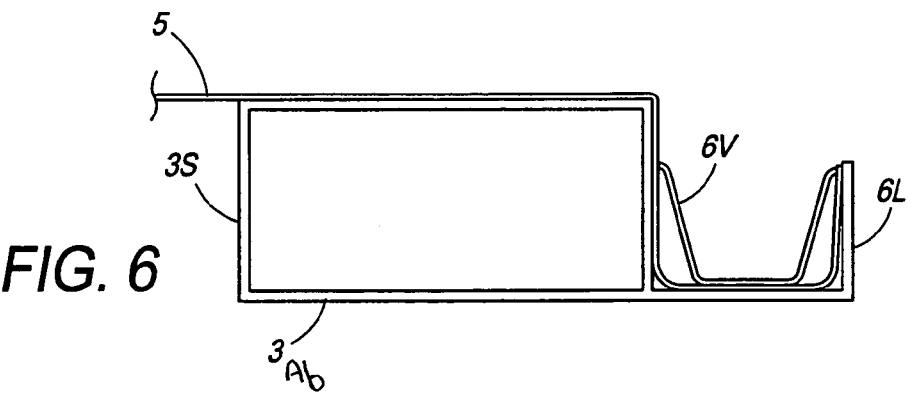
FIG. 6 is a magnified elevational cross-sectional view taken along line 6-6 of FIG. 3 showing in greater detail the assembled window frame impacting absorbing windshield film and wedging member.
Figure 7:
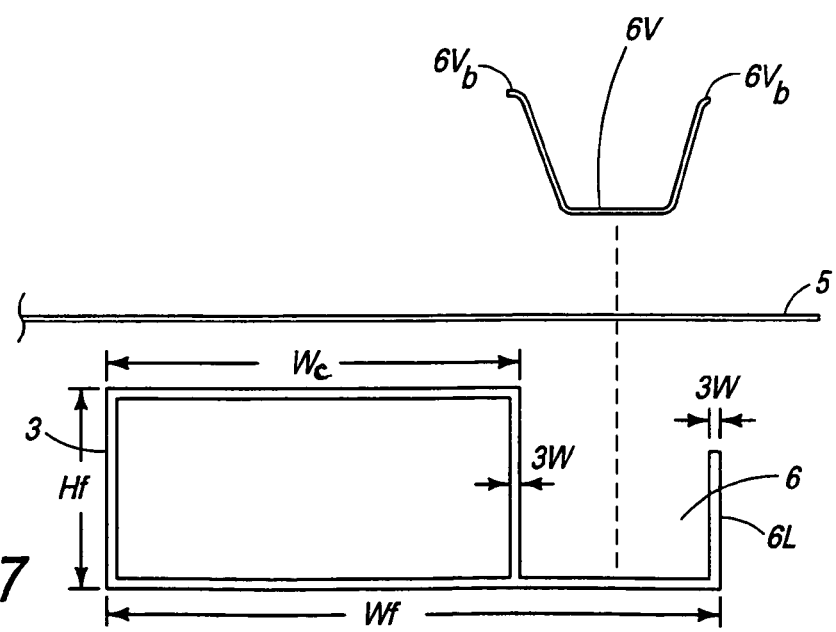
FIG. 7 is an exploded view of the unassembled components shown in FIG. 6.

The supportive requirements of the windshield frame 3 for the windshield film 5 allow the supportive frame 3 to be significantly reduced in structural and dimensional sizes. This leads to a numerous benefits to users of the golf cart windshield attachment 1 of this invention. The frame cross-sectional width Wf and height Hf as illustrated in FIGS. 5-7 may easily be reduced to respectively less than 30 mm and 20 mm. Extrudates of a frame height Hf ranging from about 10 mm to about 15 mm and a frame width Wf ranging from about 20 mm to about 25 mm are particularly effective as windshield frames 3 herein.

Figure 2:
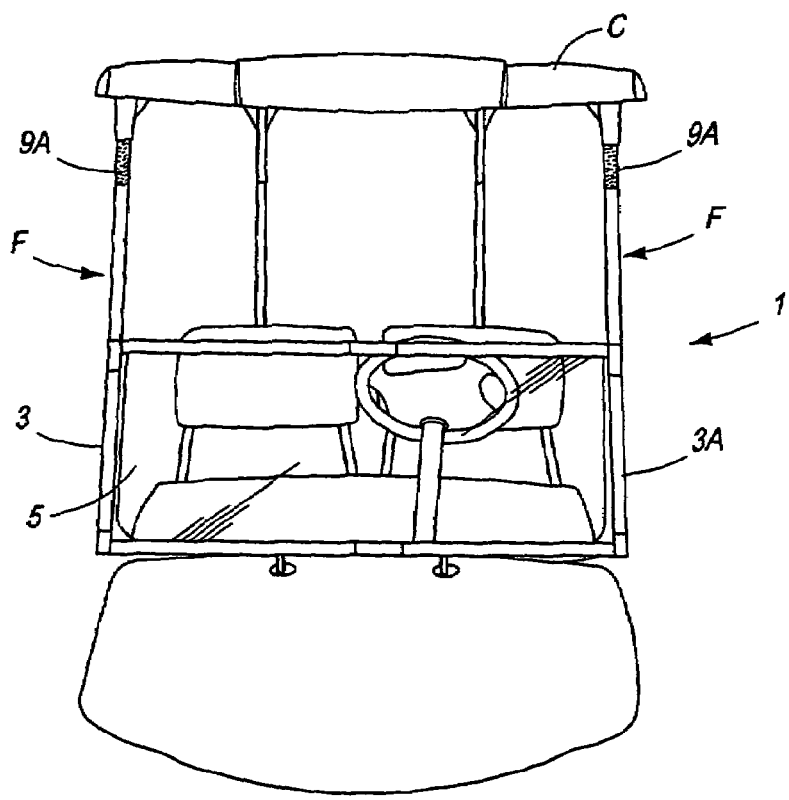
FIG. 2 depicts the golf cart equipped with the attachment shown in FIG. 1 placed in the open windshield position.
Figure 3:
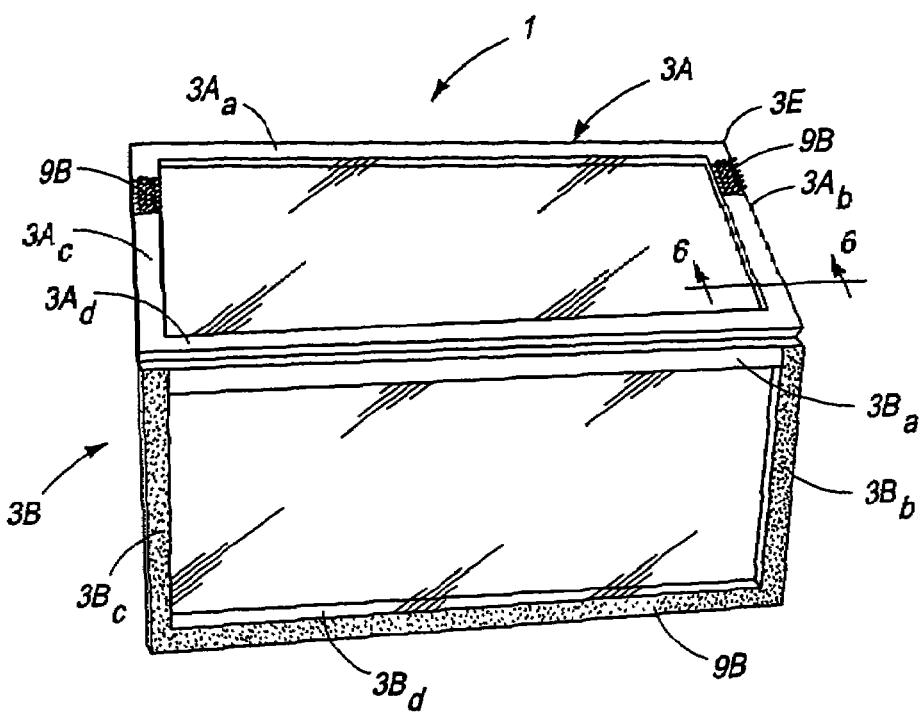
FIG. 3 depicts an elevational rear view of the hinged windshield attachment equipped with fastening members for fastening the hinged windshield to the canopy posts.
Figure 4:
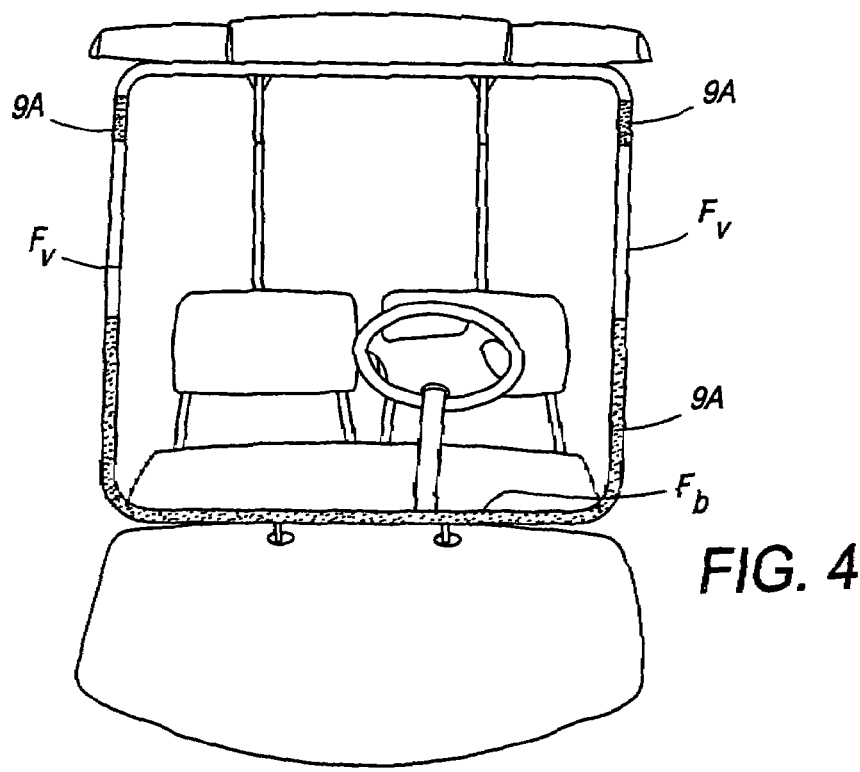
FIG. 4 depicts a canopy posts of a golf cart equipped with mating fastening members for securing the windshield attachment of FIG. 1 to the canopy posts.

With particular reference to the figures, FIGS. 1-2 and 4 disclose a golf cart window insert attachment 1 comprised a frame (generally referenced by the number 3) of two completely separately framed windshield frame sections 3A & 3B hinged together with a hinging member (generally referenced by the number 7) to form a bi-folding windshield frame 3 structure which allows the installed attachment 1 to be placed in the closed window position of FIG. 1 or open window position of FIG. 2. The frame sections 3Aa, 3Ab, 3Ac & 3Ad and the frame section 3Ba, 3Bb, 3Bc, 3Bd when sized to fit a golf car canopy frame 3 and framed together form window frames 3A & 3B for the FIGS. 1-3 windshield attachment. In contrast to the two completely closed rectangular window frame sections 3A & 3B depicted by FIGS. 1-3 in which both frames 3A & 3B circumscribe the biaxially anchored film 5, the windshield frame 3 of FIG. 8 biaxially anchors film 5 about its rectangular periphery (without frame sections 3Ad & 3Ba of frames 3A & 3B) leaving the hinge 7 side open ended.

Each brand of a golf cart canopy frame F will typically require a different size and configuration for the windshield attachment 1 to mate onto the canopy frame F. When bi-folding windshield sections 3A & 3B such as depicted in FIGS. 1-3, and 8 are utilized, the panel sections 3A & 3B will be sized so as to mate lengthwise and widthwise onto the particular canopy brand frame F design.

Commercially available horizontal side slider panels commonly used in the construction of three season porches such as EZE-Breeze Sliding Panels manufactured and distributed by PGT Industries, P.O. Box 1524, Nokomis, Fla. 34274, equipped with a frame having a channel for receiving and wedging a framed PVC window film therein may be modified to serve as window panel sections 3A & 3B herein. Unfortunately, such windshield attachments 1 fabricated from the three season porch frames are generally too bulky, heavy and prone to frictionally generated noises and wear, as well as being too restrictive in occupant viewing. A golf cart windshield frame 3 of a smaller dimensional size such as frame 3 of less than about 3.0 cm in width and most appropriately less than about 2.5 cm in width Wf with a comparable or less frame height Hf will generally provide the necessary prerequisite for a highly effective and functional golf cart windshield attachment 1. It is also most appropriate for the windshield frame width of frames 3A & 3B be of a comparable width to the canopy frame width or less. The smaller dimensionally sized frames 3 such as depicted by the cross-sectional views of FIGS. 6 and 7 may be suitably equipped with a cornering joinder 3C that may be effectively modified so as to serve as window panel sections 3A & 3B fitted with the impact resistant PVC films 5 herein. FIG. 6 depicts an exploded cross-sectional view of a typical cornering section for each frame corner of sections 3A & 3B of the window frames 3 shown in FIGS. 1-3 and 8. A cornering joinder 3C which wedges into the hollow passageway 3H of frame 3 serves to effectively join together the corner frame 3 of sections 3A & 3B. If desired, the frame corners may be reinforced with a corner bracket (not necessary and not shown) for adding rigidity to the window panel sections 3A & 3B. In order to avoid sharp cutting corners, the cornering joinder 3C may be appropriately rounded.

The bi-folding features of the windshield attachment 1 may be accomplished by hinging together the two window panel frame sections 3A & 3B along one of the lengthwise frame sides (e.g. frame section 3Ad & 3Ba) so as to allow the two window panel sections 3A & 3B to be bi-folded together onto the closed or open position as illustrated by FIGS. 1 and 2.

The windshield attachment 1 may be attached to the vehicular supportive frame F by a variety of securing or fastening means (generally referenced as 9). Industrial strength hook and loop fasteners 9 secured to the window frame panel sections 3A & 3B and the canopy frame F effectively permit the windshield attachment 1 to be readily secured or detached from the canopy frame F. Depending upon the canopy frame design, the securing canopy frame fasteners (9A or 9B representing either the hook or loop component) may be adhesively attached along the frontal portion of the canopy vertical support posts Fv or if desired (but not required) along the bottom canopy brace Fb which, depending upon the various different brands of canopy frames F may or may not be present. The hook and loop fastener combination 9A & 9B are generally provided in the form of an adhesive compressing backing which may be conveniently applied in an interfacing relationship to the canopy frame F or the opposite windshield frame 3.

In addition to fastening mounts 9A & 9B to the windshield panel frame sections 3A & 3B and the canopy frame F structure for mounting the windshield attachment 1 to frame F, the placement of panel retaining fasteners 9A & 9B onto the two windshield frame sections 3A & 3B on a windshield frame side opposite from hinges 7 will (when desired) facilitate retaining the windshield section 3A in the open window position as illustrated in FIG. 2.

With particular reference to FIGS. 1-3 and 8, the windshield frame 3 provides a circumscribing anchoring structure about the PVC film 5 which in turn provides a biaxially oriented anchoring site 6 for tautly retaining the PVC film 5 within the anchoring frame 3. The design and construction of the windshield frame 3 may suitably include an anchoring means 6 such as a film receiving and anchoring channel 6, which in cooperative conjunction with what is referred to as a rigid plastic v-spline 6V serve to stretch and wedge the PVC film 5 into film channel 6 and thereby tautly anchor the PVC film 5 to frame 3. This allows the framed film 5 to stretch when hit by an impacting blow and contract to the retracting anchoring force exerted by the frame 3. Exemplary of a film receiving channel 6 and a v-spline 6V which cooperatively engages and wedges a 10 mil PVC film to the channel 6 includes a channel measuring about 4.5 mm wide and deep for receiving a commercially available v-spline 6V measuring about 4 mm wide, 4 mm deep, and about 1 mm thickness with upper v ends having two oppositely positioned outwardly flanged section 6Vb of about 1 mm extruding outwardly.

Any hinging member 7 which allows the bi-folding of the two window panel sections 3A & 3B may be used as a hinge 7 to provide the bi-folding windshield attachment 1. FIG. 1 depicts a pair of surface mounted hinges 7 which, if desired, could be replaced with different type of hinges 7 (e.g. piano, butt, strap, etc.) or as a rod type hinge 7 such as illustrated by FIG. 8.

For most applications, it is desirable to minimize the width of the window frame 3 structure so as to increase visibility at the bi-folding site. This may be accomplished by reducing the size of both the hinge 7 and window frame 3. This will provide for more visibility and less occlusion of the occupant's outward view.

Figure 8:
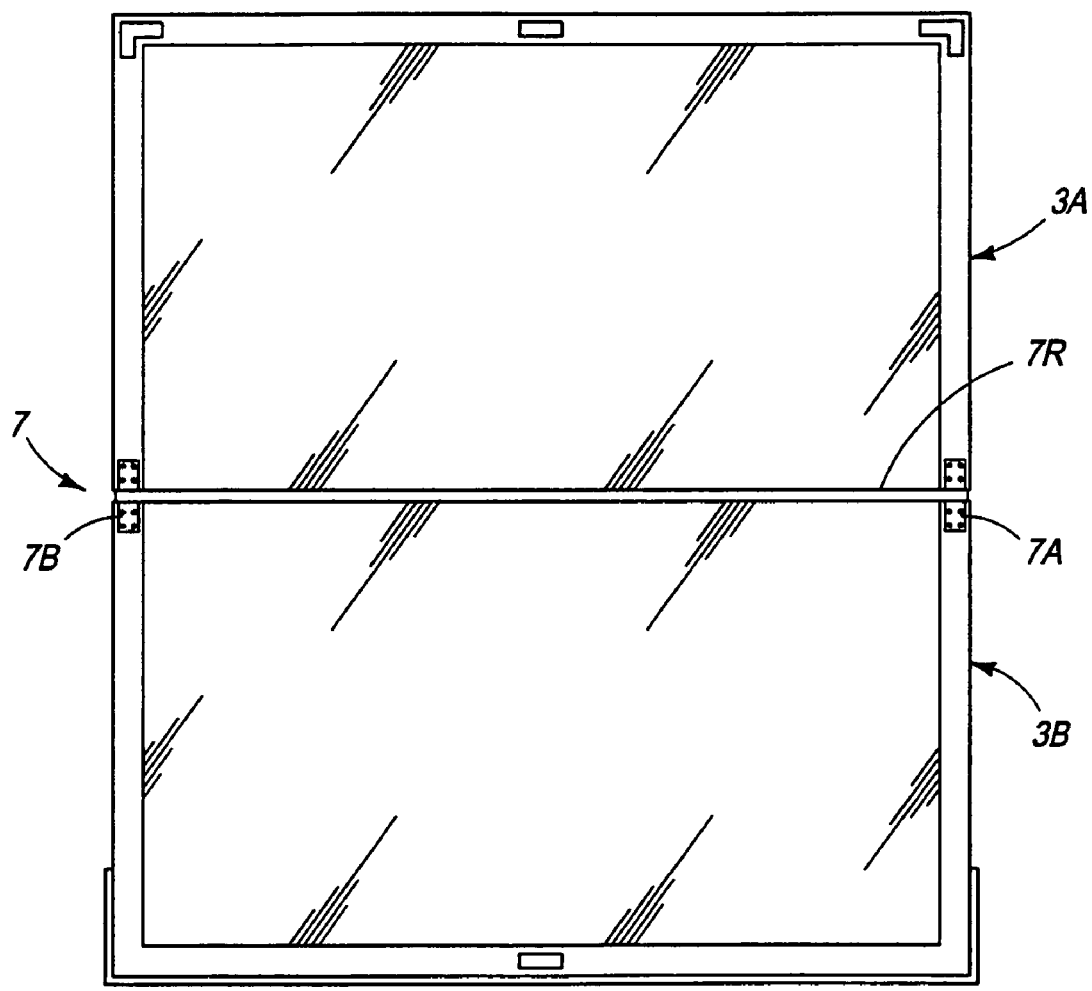
FIG. 8 illustrates another embodiment of the windshield attachment shown in FIG. 1.

The embodiments of the invention as depicted in FIG. 8 further minimizes the visual obstructions to the golf cart occupants while still affording a biaxial anchored film 5 and a highly functional windshield attachment 1 for a golf cart canopy C. In the depiction of FIG. 8, the two abutting longitudinal frame sections 3Ad & 3Ba of windshield sections 3A & 3B at the bi-folding site have been replaced with rod hinge 7 with the outer peripheral margin support for the frame 3 being provided by two rod receiving hinges 7A & 7B. The two window panel sections 3A & 3B depicted by FIG. 8 basically involve a rectangular frame 3 configuration created by two unshaped frames 3A & 3B joined or secured together with two hinges 7A & 7B (e.g. a butt or strap hinge) by conventional screws or other suitable hinge attachment means. Instead of hinging the system as shown in FIGS. 1 and 2, a hinging rod 7R threaded for bolting at both ends hinges together hinge sections 7A & 7B. As may be observed, the hinge rod 7R serves as a pivotal hinge mount and as a bi-folding stretch point guide for the window film 5 when the hinged panel section 3A & 3B are placed in the closed and open window positions as depicted by FIGS. 1 and 2. The golf cart windshield attachment 1 as depicted in FIG. 8 optimizes the viewing area of the occupant while also providing a frame structure which places anchoring restraints upon impacting absorption capacity of the PVC window film 5. The FIG. 8 golf cart insert window attachment 1 may be secured to the canopy frame F in the same manner in which the fully framed two panel frame sections 3A & 3B of FIGS. 1 and 2 may be secured to the frame F.

The window frame 3 shown in FIG. 8 may also be similarly provided with the film receiving channels 6 and v-spline 6V as shown in greater detail in FIGS. 6 and 7. The circumscribing frame 3 of frame sections 3A & 3B will tautly secure the PVC window film 5 biaxially to the frame 3 and also allow for easy replacement of the film 5 should the film 5 need to be replaced.

The transparent high absorbing and high memory polyvinyl chloride film 5 effectively used as the window 5 herein may be obtained from a variety of commercial sources. The window film 5 is typically provided in either a clear or tinted film form. Such polyvinyl chloride films 5 have been used as transparent window panes for use in three season or sun rooms. Illustrative of commercially available polyvinyl chloride films useful as windshield films 5 herein may be commercially procured from Paragon Sourcing Inc., 179 East Athens Street, Winder, Ga. 30680, in 50 foot rolls of a 44 inch width in dark gray or super clear 10 mil PVC film, (0.3PHR UV and −5° C., P.O. No. PVC 041505 or part no. 610MVG4450-NC). Such polyvinyl chloride films will possess the necessary high impact absorption and elasticity properties with full memory recovery characteristics so as to recover to its indigenous film structure when impacted upon by an external force. The golf windshield attachment 1 substantially reduces replacement costs of the windshield should such a replacement be desired or needed. If one desires to replace the clear transparent polyvinyl chloride film 5 with a tinted gray polyvinyl chloride film 5, one merely cuts the film replacement 5 to a size to fit the windshield frame 3 and then replaces the new film for the old film.

Although a variety of means for attaching the attachment 1 to a golf cart frame F may be used, the use of industrial grade intermeshing or interlocking fastening members as commonly referred to as hook and loop fasteners (referenced herein as 9A & 9B) are particularly effective. Such fastening members are typically sold as a loop receiving nap or loop member and an interlocking hook or mushroom shaped pedestal member which when intermeshed or pressed together tenaciously interlock the mating units together. The industrial grades of such mating interlocking fastening members will typically have a stronger female element (i.e. hook) and a stronger male element hook fabricated of a greater density and filament size than the more commonly available conventional household types of hook and loop fasteners. This permits the industrial grade of hook and loop fasteners to more tenaciously interlock and secure the insert windshield attachment 1 to the canopy frame F while also effectively securing together the bi-foldable panel sections 3A & 3B in the depicted open or the closed position.

The industrial grade fasteners will generally comprise a hook mat and a loop mat anchored to plastic film strip which on an opposite side from the fastening mats include an adhesive layer covered by a tear-away plastic strip which may be removed when it is desired to adhesively attach the mating hook and loop strips to the desired object such as the windshield frame 3 and canopy frame F. By attaching these mating hook and loops fastening members 9A & 9B at the appropriate canopy frame F and window frame 3 positions such as shown in the FIGS. 3 and 4, the readily installable and removable windshield insert attachment 1 embodiments of this invention can be achieved. The industrial grade hook and loop fasteners 9A & 9b effectively retain the windshield panel section 3A in the open or closed window position. The hook or the loop components 9A & 9B may be interchangeably attached to either canopy frame F or the window frame 3.

Industrial grade hook and loop fasteners 9 for use in the depicted embodiments of this invention, for example, may be obtained from Velcro USA Inc., 406 Brown Ave., Manchester, 181848, Velcro Brand Loop 1000, 1" (25.4 mm) white or black 010 PSA 0114; and Part: 10532-02760, Velcro 181852 1" Hoo, Ctrl: wj040405, Re-order Part # 181852, Velcro Brand Hook 88, 1" white or black 010 PSA 0114.

EXAMPLE 1

Referring to the bi-folding windshield attachment 1 embodiments as depicted by FIGS. 1-8, this example illustrates the fabrication of the golf cart windshield attachment 1 as illustrated by FIGS. 1-3. The frame 3 was constructed from slider panels commonly used in three season porches under the EZE-Breeze sliding panels manufactured and distributed by PGT Industries, P.O. Box 1529, Nokomis, Fla. 34274, equipped with a film receiving channel 6 and v-spline 6V for wedging the film 5 to channel 6. Two rectangular shaped aluminum frames each measuring 40" by 17¼" were thus modified so as to serve as a windshield frames 3A & 3B for the windshield attachment 1 to a canopy frame F as depicted by FIG. 4. Each windshield frame 3A & 3B measured 1½ inch in width and ⅝ inch in thickness. Such frames may be electroplated with a white, almond, or bronze coating. The glazing emplaced between window frame 3A & 3B was a 10 ml polyvinyl chloride film 5 with 100% memory as described in more detail above. The two frames 3A & 3B were attached together along one of their longest sides by a stainless steel piano hinge 7 with stainless steel screws. Bottom window 3B was attached to the front face of golf cart canopy frame F with 1 inch industrial strength Velcro (hoop and loop) mating member 9A in a u-shaped configuration as illustrated in FIG. 4. The Velcro fastening strip 9B for the golf windshield attachment 1, extended along the entire length of the back sides of the bottom frame 3B as shown in FIG. 3 and if applicable according to golf cart canopy design, the Velcro 9A may be matingly extended along the entire length of bottom frame F as shown in FIG. 4. Mating Velcro strips 9A & 9B (e.g. a 2 inch strip) are correspondingly attached to the center of the top windshield panel section 3A on the front 3A panel side and a corresponding Velcro 9B is attached to the bottom frame 3B in the center of the bottom panel 3B on the frame front side 3B as illustrated by FIG. 4. When the golf cart windshield attachment 1 is opened the mating 2 inch strips 9A & 9B will keep the windows secure and without rattling. As further shown in FIG. 4, Velcro 9 may also be attached in 2 inch pieces to the upper side corner of the golf cart canopy frame F and the upper sides next to the corners of the top frame 3A on the backside of the top frame 3A. This allows the top window 3A to be opened and closed onto fastening members 9A & 9B. Velcro 9A may be attached to front face of golf cart running the entire frame F width and length with matching Velcro 9B on back side of bottom panel 3B to secure window frame to canopy frame F. Both frames 3A & 3B may be equipped with weather stripping around all four sides to reduce rattling and vibration. Two 2"×2" 90 degree angled zinc or stainless steel plated supports may, if desired, be attached to both outside corners of top frame 3A for added support. In some applications the bottom panel 3B will be attached to frame F of the golf cart canopy frame F with stainless steel screws instead of Velcro.

EXAMPLE 2

In order to provide a windshield attachment 1 of a lighter weight with a higher degree of occupant visibility, extrudates of a smaller dimensional size were fabricated. In this example, two rectangular shaped aluminum frames 3A & 3B each measuring 40" by 17¼" with a 45 degree angle end cuts were fabricated from extruded aluminum extrudates manufactured by PGT Industries and connected together with the frame cornering section 3C to form the window attachment 1 as depicted in FIGS. 1-3. The aluminum extrudates were made using a die which provided an extrudate having a cross-sectional view as depicted by FIGS. 6 and 7. The walls 3W of the extrudate measured about 1 mm in thickness, defined by a frame base measuring 23 mm in width Wf terminated at one end by a 6 mm lip extension 6L. The main support frame structure of frames 3A & 3B was created by a closed rectangular boxed structure 3S measuring about 12 mm in boxed frame height Hf by 18 mm in box width Wc which in conjunction with the lipped section 6L provides the grooved channel 6 for wedging film 5 therein. The frame sections 3Aa, 3Ab, 3Ac, 3Ad, 3Ba, 3Bb, 3Bc & 3Bd were electroplated with a black electroplated coating. As mentioned, the frame cornering cuts were initially formed by cutting a 45 degree angle cut at each frame piece end followed by a rounding of about a 5 mm arcuate cut from the outermost portion of cut tips so as to permit rounding of the exposed cornering edges 3E to eradicate an exposed sharp edged frame 3. With particular reference to FIG. 5, the appropriate framed structure for window frames 3A & 3B was then formed by cornering each of the frame cornering ends 3E with a screen section corner or cornering joinder 3C (part no. A1202 adapted for use with frames 102-RF and 132-RF, distributed by The RiteScreen Company, Inc., 4314 Route 209, Elizabethville, Pa. 17023) which measures 0.330 inches in height and 0.510 inches in height and is designed to wedge onto boxed structure 3S to secure the cornering edges 3E of frame sections 3A & 3B together. Film 5 was then drawn tightly onto frame sections 3A & 3B by wedging the covering film 5 into the film receiving channel 6. In wedging the film 5 onto frame sections 3A & 3B, sufficient film 5 to cover the entire windshield frames 3A & 3B including the film 5 tautly wedged onto film receiving channel 6 was drawn securely tight against frames 3A & 3B. The film pieces 5 thus margined along the film receiving channel 6 of each frame 3A & 3B as illustrated by FIG. 7 were then wedged into a tautly secured position onto frame 3 utilizing a v-spline 6V (a rigid plastic wedge sold and distributed by Custom Windows, 981 16$^{th}$ Street, Ocala, Fla. 34470) as depicted by FIG. 6. The wedging v-spline 6V comprises the depicted u-shaped wedging piece measuring about 4 mm in depth and width terminated by a pair of transverse outwardly extending 1 mm flanges 6Vb or lips for wedging film 5 within grooved channel 6. The window film 5 wedged between the window frame 3A & 3B was the same 10 ml polyvinyl chloride film 5 with 100% memory as used in Example 1. The stretched film 5 was substantially uniformly stretched and retained by frames 3A & 3B without any evidence of unevenness in stretched film 5 within frames 3A & 3B. The two frames 3A & 3B were attached along one of their longest sides 3Ad & 3Ba by a pair of hinges 7. Surface mount hinges (pinless surface-mount hinges of a 1½ inch leaf height and a 1 inch open width, 0.175 inch think with two holes each leaf for #6 screw sold and distributed by McMASTER-CARR, 200 Aurora Industrial Pkwy, P.O. Box 94930, Cleveland, Ohio 44101-4930) juxtapositioned along the outermost periphery of the detachably hinging corners were attached with the #6 stainless steel screws to hinge windshield frames 3A & 3B together. Bottom window frame 3B of the bi-folding windshield attachment 1 was then attached to front face of golf cart canopy frame F using 1 inch industrial strength Velcro mating member 9A in a u-configuration as illustrated by FIG. 4. An interfacing and mating Velcro fastening strip 9B was correspondingly placed along the entire length of the back side of the bottom section 3Bd of frame 3B and correspondingly mating portions of frame sections 3Bb & 3Bc. The upper frame 3A was secured to the canopy frame F by adhesively securing two 2 inch strips of Velcro fasteners 9B along the uppermost side frame portion of frame section 3Ab & 3Ac with an interfacing placement of the corresponding mating fastener 9A onto the upper portion of frame posts F as depicted in FIG. 4. Mating Velcro strips 9B (2 inch strips) were then correspondingly attached to the front center of the top window panel section 3Aa with a 1 inch strip 9B on the front lower frame section 3Bd. The Velcro strip 9 is also attached in 2 inch strips to the upper side corner of the golf cart canopy frame F and the upper sides next to the cornering edges on the backside of the top frame 3A. This allows the top window 3A to be opened and closed. Accordingly, Velcro strip 9A is attached to front face of golf cart running the width and length of the bottom crosswise canopy frame support F with matching Velcro 9B on back side of bottom frame panel 3B to secure bottom window frame 3B to canopy frame F.

The golf cart windshield attachment 1 when attached to the golf cart canopy frame F was substantially lighter in weight and much more readily attachable and detachable therefrom. The lighter windshield attachment 1 was more efficient in fuel economy than the conventional rigid plastic windshields in current use. The attachment 1 was capable of absorbing a powerful errant golf ball shot while returning to its taut form without any risk of shattering or damage to the windshield film 5.

EXAMPLE 3

With particular reference to FIG. 8, utilizing the same type of windshield frames 3A & 3B as described in Example 2 as sized to fit CLUB CAR golf cart canopy frame F, the outer frame sides of frames 3A & 3B were fabricated so as to accommodate for the two windshield frame 3 sections (frame sections 3Ad & 3Ba) being removed from the Example 2 frames 3A & 3B. This resulted in two u-shaped window panel section 3A & 3B as shown in FIG. 8 utilizing the windshield frames 3A & 3B without frame sections 3Ad & 3Ba. The Example 2 extrudates were also used to form the supportive frame 3 of this example. A pair of hinges 7A & 7B adapted to receive a ⅜ inch diameter hinge rod were placed mating positions at the terminating ends margins of side panel frame sections 3Ab, 3Bb, 3Ac & 3Bc as illustrated in FIG. 8. A ⅜ inch rod 7R threaded on both ends is inserted and nutted with a nut at each end to couple and hinge together hinges 7A & 7B to form a bi-fold for window panel section 3A & 3B. The threaded rod 7R when nutted with nuts inside of hinges 7A & 7B and then with nuts on the outside of hinges 7A & 7B will help maintain the frame 3 at the appropriate lateral distance so as to retain the biaxial anchoring of film 5 to frame 3. The v-spline 6V (as utilized in Example 2) was used to wedge and anchor the 10 mil impact absorbing PVC film 5 of Example 2 into the frame film channel 6 onto the circumscribing frames 3A & 3B. Using the mating industrial Velcro fastening strips 9A & 9B, the attachment 1 may then be attached to a golf cart canopy frame F in the same fashion as described in above Example 1 and 2.

In this example, the adjacently positioned frame sections (i.e. frame sections 3Ad & 3Ba) were eliminated from the rectangular circumscribing frames 3A & 3B of Example II to provide two rectangular frame sections 3A & 3B each of which is open-ended lengthwise along one of the horizontally disposed sides of frames 3A & 3B. The horizontally extending rod 7R hinging together butt hinges 7A & 7B at each end of the bi-fold hinging helps to maintain the window film 5 taught when the window accessory is placed in both the open position and the closed position.

If film 5 becomes damaged or it becomes desirable to replace an untinted film 5 with a tinted film 5, the film 5 may be readily and inexpensively replaced with a desired film 5 simply by removing the damaged or undesirable mounted film 5 and replacing it with a new film 5. Since the wedged films are very durable against normal wear and tear as well as impacting damage, the window films are generally not prone to the damage normally associated with conventional plexiglass windshields. The windshields attachment 1 is significantly lighter in weight thus leading to more efficient fuel consumption and power output of the golf cart equipped with attachment 1. The windshield attachment may be easily installed and detached from the golf canopy frame 3 with its abnormally light weight greatly enhancing the task.

What is claimed is:

1. A golf cart windshield attachment having hinged sections, said attachment consisting essentially of an impact absorbing polyvinyl chloride film possessing elastic memory so as to return to a tautly stretched film structure after receiving an impacting blow, said film being stretched and firmly anchored onto a windshield frame sized to fit so as to permit the positioning of the windshield sections to an open position and a closed position, and a mounting member for mounting the windshield frame to the golf cart.

2. The golf cart windshield attachment according to claim 1 wherein the frame comprises a bi-folding windshield sections.

3. The windshield attachment according to claim 1 wherein the frame comprises an extrudate of a dimensional width and height respectively of less than 25 mm and less than 15 mm.

4. The golf cart windshield attachment according to claim 2 wherein the windshield frame consists essentially of a u-shaped lower windshield section having two upwardly extending legs and an inverted u-shaped upper windshield section having two downwardly extending legs hinged together along an upper margin of said upwardly and downwardly legs to form the bi-folding windshield sections.

5. The golf cart windshield attachment according to claim 3 wherein windshield frame is equipped with an adhesively applied hook and loop fastener combination so as to permit expeditious attachment and detachment of the windshield attachment to the golf cart.

6. The golf cart windshield attachment according to claim 3 wherein the frame includes a film receiving channel and a wedging member tautly stretching and wedging the film to the windshield frame so as to anchor the stretched film onto said frame.

7. The golf cart windshield attachment according to claim 6 wherein the frame has a specific density of less than 3.0.

8. The golf cart windshield attachment according to claim 7 wherein the frame consist essentially of an aluminum extrudate and the wedging member comprises a plastic v-spline with a pair of outwardly biasing flanges to securely anchor the film to the film receiving channel.

* * * * *